US008756514B2

(12) United States Patent
Jones et al.

(10) Patent No.: US 8,756,514 B2
(45) Date of Patent: Jun. 17, 2014

(54) SYSTEM AND METHOD FOR REAL-TIME SCHEDULING

(75) Inventors: Angela Richards Jones, Durham, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 12/109,639

(22) Filed: Apr. 25, 2008

(65) Prior Publication Data

US 2009/0271716 A1 Oct. 29, 2009

(51) Int. Cl.
*G06Q 10/06* (2012.01)

(52) U.S. Cl.
USPC ............ 715/753; 715/751; 715/758; 715/963

(58) Field of Classification Search
USPC ............................................. 715/963; 3/963
See application file for complete search history.

(56) References Cited

U.S. PATENT DOCUMENTS

| | | | | |
|---|---|---|---|---|
| 6,016,478 A * | 1/2000 | Zhang et al. | .................. | 705/7.19 |
| 6,392,669 B1 * | 5/2002 | Matoba et al. | ................. | 715/751 |
| 6,938,213 B2 * | 8/2005 | Brown et al. | .................. | 715/758 |
| 7,007,067 B1 * | 2/2006 | Azvine et al. | ................. | 709/206 |
| 7,108,173 B1 * | 9/2006 | Wang et al. | ..................... | 235/377 |
| 7,130,885 B2 | 10/2006 | Chandra et al. | | |
| 7,395,221 B2 * | 7/2008 | Doss et al. | .................... | 705/7.19 |
| 7,571,254 B1 * | 8/2009 | Canova et al. | ................. | 709/248 |
| 7,660,904 B2 * | 2/2010 | Qureshi et al. | ................. | 709/229 |
| 7,703,048 B2 * | 4/2010 | Alford et al. | ................... | 715/747 |
| 2003/0130882 A1 * | 7/2003 | Shuttleworth et al. | ............ | 705/8 |
| 2004/0172455 A1 * | 9/2004 | Green et al. | ................... | 709/207 |
| 2005/0125737 A1 * | 6/2005 | Allen et al. | ..................... | 715/758 |
| 2009/0204904 A1 * | 8/2009 | Mujkic et al. | ................. | 715/753 |
| 2010/0022225 A1 * | 1/2010 | Benger et al. | .............. | 455/414.1 |

OTHER PUBLICATIONS

Haynes et al, "An automated meeting scheduling system that utilizes user preferences," 1997, ACM, Agents '97 Proceedings of the first international conference on Autonomous agents, pp. 308-315.*
Brien M Posey, Exchange Amdin 101: Outlook's group calendars, available at http://searchexchange.techtarget.com/tip/0,289483,sid43_gci998617,00.html, Aug. 10, 2004.
Shared Spaces . . . The Collaboration Advisor, available at http://www.shared-spaces.com/blog/2005/03/pillar_4_coordi.html, Mar. 23, 2005.

(Continued)

*Primary Examiner* — Alvin Tan
(74) *Attorney, Agent, or Firm* — Jeffrey T. Holman

(57) ABSTRACT

A system and method for dynamically scheduling a meeting time in association with an instant messaging client. The system includes a chat server, a grid scheduling server, a local instant messaging client, a remote instant messaging client, and a grid scheduling client. The instant messaging client facilitates a chat session in conjunction with the chat server. The grid scheduling server generates a representation of scheduling information from a scheduling matrix including a list of times arranged transversely to a list of participants to the meeting. The grid scheduling client in conjunction with the grid scheduling server hosts a grid scheduling session in real-time on the local and remote instant messaging clients and schedules the meeting time according to real-time input from participants on the local and remote instant messaging clients.

15 Claims, 7 Drawing Sheets

(56) References Cited

OTHER PUBLICATIONS

Coordinate meetings seemlessly with Diarised, available at http://techzoogle.com/coordinate-meetings-seemlessly-with-diarised/, Feb. 3, 2007.

Brien M Posey, Exchange Amdin 101: Outlook's group calendars, available at http://searchexchange.techtarget.com/tip/0,289483,sid43_gci998617,00.html. Last accessed Apr. 24, 2008.

What is Jiffle?, available at http://www.jifflenow.com/website/what_is_jiffle. Last accessed on Apr. 24, 2008.

Shared Spaces . . . The Collaboration Advisor, available at http://www.shared-spaces.com/blog/2005/03/pillar_4_coordi.html. Last accessed Apr. 24, 2008.

Coordinate meetings seemlessly with Diarised, available at http://techzoogle.com/coordinate-meetings-seemlessly-with-diarised/. Last accessed Apr. 24, 2008.

Capture critical meeting information, available at http://www.meetingsense.com/products/features/capture.aspx. Last accessed on Apr. 24, 2008.

Meeting Maker Calendar Scheduling Software Features & Benefits, available at http://www.peoplecube.com/products/meetingmaker/features_benefits.cfm. Last accessed on Apr. 24, 2008.

* cited by examiner

SYSTEM AND METHOD FOR REAL-TIME SCHEDULING

BACKGROUND

During an instant messaging (IM) conversation with another individual or a group, the topic of scheduling a meeting often comes up. A common scenario that occurs during an IM session is that each of the chatting parties opens a separate calendaring system to check their current appointments. Each person opens his or her own calendaring system to look through various dates and times for available time slots. Each communicates his or her available time slots through text or audio input through each person's respective IM client.

As each individual in the group finds various openings and available time slots and communicates the openings and available time slots through their IM client, one of the individuals may act as a coordinator to coordinate the available times of each of the individuals. Alternatively, each individual may go through the text of the other users to try and find dates and times that work for everyone. Going through the text of each of the individuals often requires going back and forth between the IM client and the calendaring system, scrolling up and down through the IM text history, and checking the available time slots on the calendaring system. Of course, as the size of the group grows, the difficulty and complexity of coordinating and keeping track of each user's available time slots becomes more difficult. Additionally, at least one of the users may be communicating using an audio input option of the IM client. The coordinator must remember and/or write down the dates and times that work for each audio inputting user.

Clearly, coordinating a meeting time over an IM conversation is a time consuming process since each of the individual calendaring systems are viewable only by each user. Additionally, the search for mutually open times consumes time going back and forth between an IM client and a calendaring system.

SUMMARY

Embodiments of a system are described. In one embodiment, the system dynamically schedules a meeting time in association with an instant messaging client. The system includes a chat server and a grid scheduling server. The chat server facilitates a text chat session between multiple instant messaging clients. The grid scheduling server facilitates a grid scheduling session in real-time in conjunction with the multiple instant messaging clients, schedules the time of the meeting according to real-time inputs from participants on the multiple instant messaging clients, and generates a representation of scheduling information from a scheduling matrix that includes a list of times arranged transversely to a list of the participants to the meeting. Other embodiments of the system are also described.

Embodiments of an apparatus are also described. In one embodiment, the apparatus includes a local instant messaging client and a grid scheduling client. The local instant messaging client facilitates a chat session with a remote instant messaging client via a chat server. The grid scheduling client hosts a grid scheduling session in real-time in conjunction with the instant messaging clients and schedules a meeting time in conjunction with a grid scheduling server according to a first real-time input from a first participant on the local instant messaging client and a second real-time input from a second participant on the remote instant messaging client. The grid scheduling session includes a list of times arranged transversely to a list of the participants to the meeting.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Figure 3A:
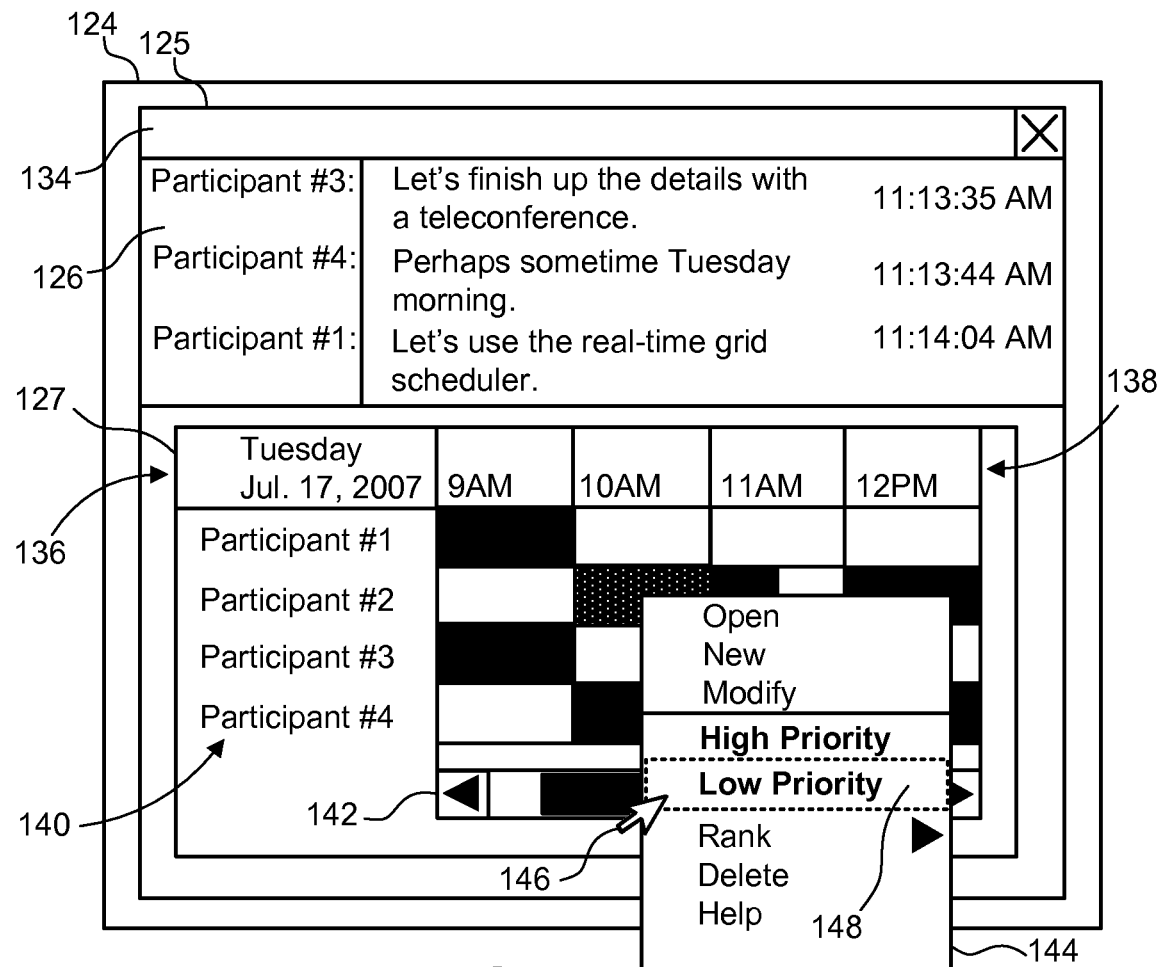
FIGS. 3A and 3B depict embodiments of the IM interface and real-time grid scheduling session on the client computer of FIG. 2.
Figure 3B:
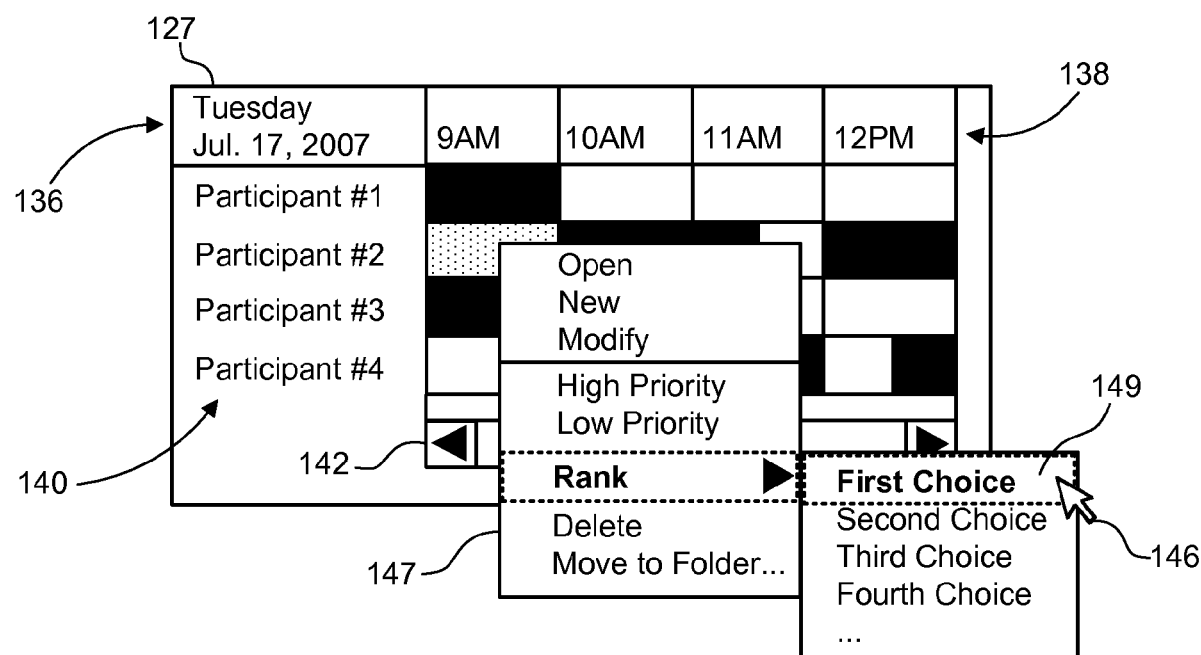

While many embodiments are described herein, at least some of the described embodiments facilitate dynamically scheduling a meeting time in a chat session. The chat session may incorporate a grid scheduling session in which the times of a specific date are transversely displayed to a list of participants to the meeting. As used herein, the designation of a transverse configuration simply indicates that the times and participant names are arranged relative to one another so that multiple times correspond to each participant and multiple participants correspond to each time. While some embodiments may use a grid to implement a transverse arrangement of the times and participant names (e.g., as shown in FIGS. 3A and 3B), other arrangements in which the times and participant names intersect may be used.

In one embodiment, the display includes a grid of the existing appointments and available time slots of all the participants to the meeting. The grid scheduling session allows each participant to prioritize their existing appointments and rank their available time slots according to their preferred meeting times. Other embodiments are also described below with specific reference to the corresponding figures.

Figure 1:
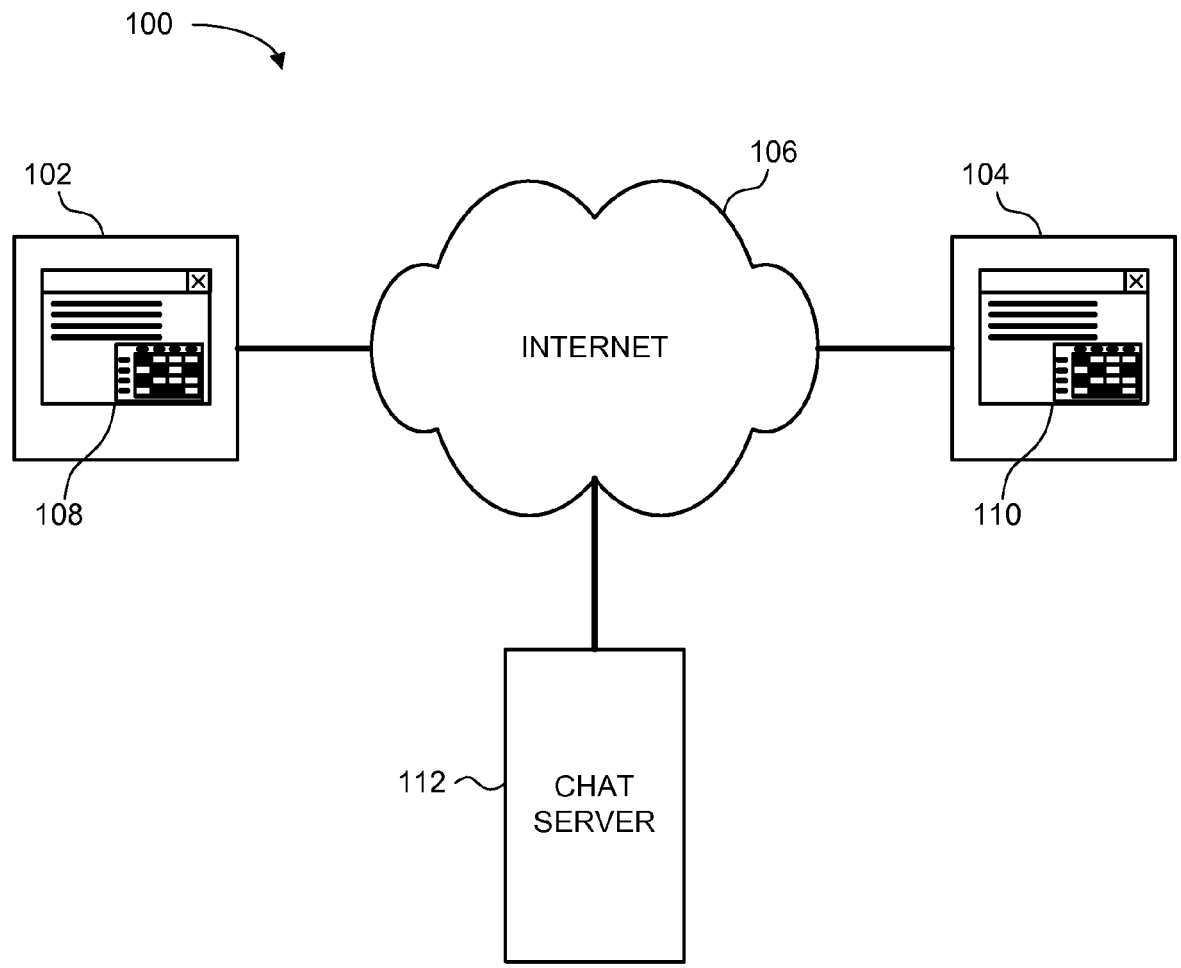
FIG. 1 depicts a schematic block diagram of one embodiment of an instant messaging system.

FIG. 1 depicts a schematic block diagram of one embodiment of an instant messaging (IM) system 100. The illustrated IM system 100 includes multiple nodes 102 and 104 connected together via a computer communication network such as the internet 106. The nodes 102 and 104 are also referred to, in some instances, as client computers 102 and 104. Each of the nodes 102 and 104 may be referred to as a sending node and/or a receiving node, depending on the direction of data flow between the nodes 102 and 104 at any given time. It should also be noted that the IM system 100 may include more than two nodes. Each node 102 and 104 implements an IM client (represented by the depicted IM user interfaces 108 and 110) so that an IM chat and scheduling session may be realized between the IM clients.

Figure 4:
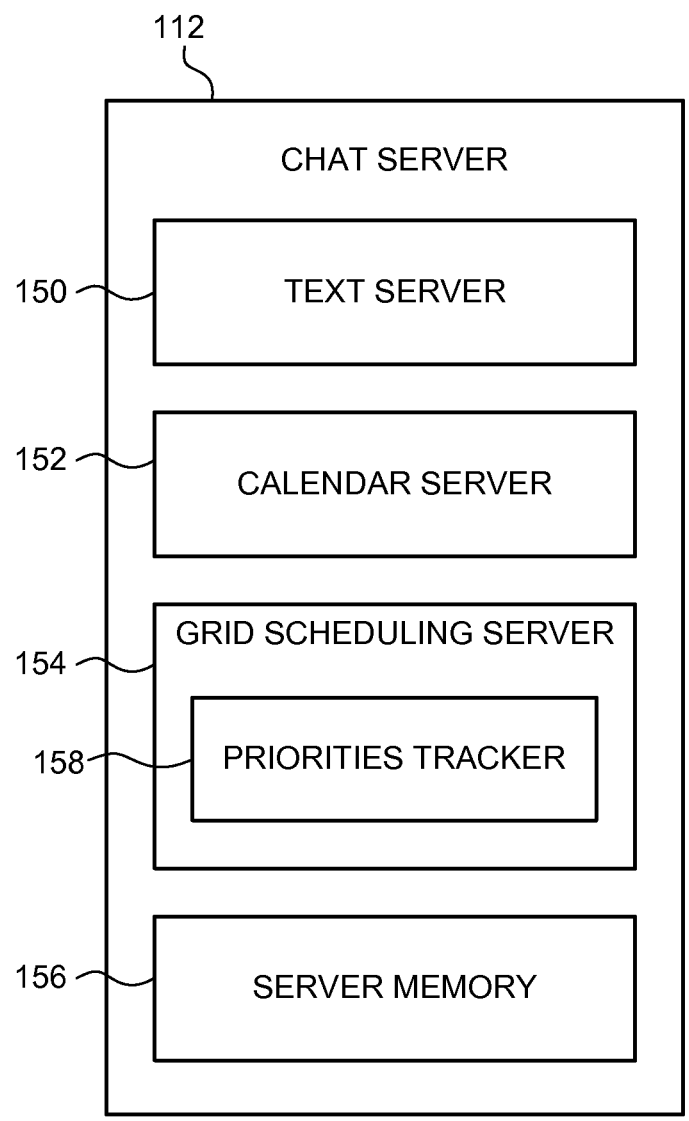
FIG. 4 depicts a schematic block diagram of one embodiment of the chat server of the instant messaging system of FIG. 1.

The illustrated IM system 100 also includes a chat server 112 to facilitate the IM chat and scheduling session between the multiple nodes 102 and 104. One example of the chat server 112 is shown in FIG. 4 and described in more detail below. In some embodiments, the chat server 112 facilitates a chat and scheduling session between the IM clients on the various nodes 102 and 104. Additionally, where more than two nodes and IM clients are present within the IM system 100, the chat server 112 may facilitate a single IM chat and scheduling session among more than two nodes, or multiple IM sessions between the same or different nodes within the IM system 100. It should be noted that the configurations of the nodes 102 and 104, the IM clients, and the chat server 112 are not limited to particular hardware or software implementations. For example, multiple chat servers 112 may be present within the IM system 100 to facilitate multiple simultaneous IM sessions.

When instant messages are transmitted, for example, from the sending node 102 to the receiving node 104, the instant messages are parsed and may be displayed to users via the IM user interfaces 108 and 110 at the corresponding nodes 102 and 104. Additionally, the instant message transmissions may include information pertaining to the sending user, information pertaining to the receiving user, and other pertinent data such as scheduling information and data. This data can be extracted from the instant message and optionally displayed by the IM user interfaces 108 and 110. Examples of pertinent data include references to the sender and one or more recipients, by user name and/or network IP addresses. Pertinent data also can include a message subject, timestamps, or other similar data. Timestamps may include a date and/or time corresponding to the transmitted instant message. Pertinent data also can include real-time scheduling data, or other similar data.

Additionally, a voice communications link can be established between the nodes 102 and 104. Although the voice communications link can be provided through any suitable voice communications technology, at least one embodiment establishes the voice communications link over the internet 106 based upon the established Voice over IP (VoIP) protocol. Other embodiments may use other protocols or technologies to establish the voice communications link between the nodes 102 and 104.

Figure 2:
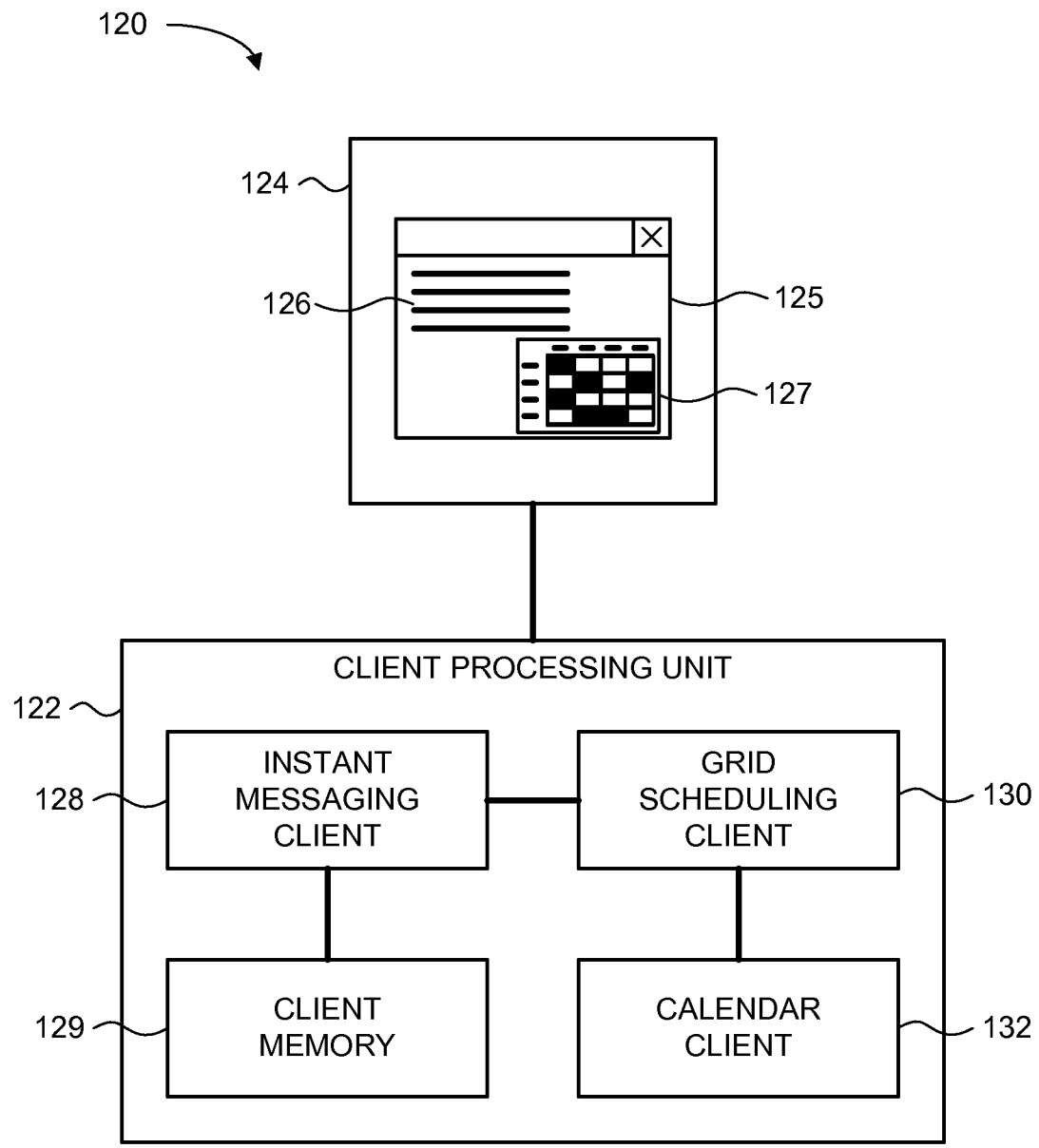
FIG. 2 depicts a schematic block diagram of one embodiment of a client computer that is substantially similar to the nodes of the instant messaging system of FIG. 1.

FIG. 2 depicts a schematic block diagram of one embodiment of a client computer 120 that is substantially similar to the nodes 102 and 104 of the IM system 100 of FIG. 1. The illustrated client computer 120 includes a client processing unit 122 and a display device 124. In some embodiments, the display device 124 displays an IM user interface 125, similar to the IM user interfaces 108 and 110 described above. In some embodiments, the IM user interface 125 displays a chat history log 126 and a real-time scheduling session 127.

The client processing unit 122 includes an IM client 128, a client memory 129, a grid scheduling client 130, and a calendar client 132. The client memory 129 is coupled to the IM client 128 and stores data related to a chat session and the real-time scheduling session 127. The client memory 129 stores data such as a chat history log 126 and real-time scheduling session 127. One example implementation of a real-time scheduling session 127 is shown in FIGS. 3A and 3B and described in more detail below. Some embodiments of the client memory 129 also store other data in addition to the chat history log 126 and the real-time scheduling session 127. In some embodiments, the client memory 129 stores appointment data associated with the calendar client 132.

The IM client 128 facilitates a chat session with a remote IM client on another client computer. As described above, the chat server 112 facilitates the chat session between the local and remote IM clients. The real-time scheduling session 127 stored in the client memory 129 may be associated with the chat session between the local IM client and the remote IM client. In some embodiments, the local IM client 128 is configured to aggregate both text data and voice transcribed data from the chat server 112. In this way, a user may view the chat history log 126 and the real-time scheduling session 127, including the text and voice transcription data, on the display device 124.

In some embodiments, the IM client 128 receives text data from the chat server 112. The IM client 128 then chronologically aggregates the text data according to timestamps associated with the text data. Hence, the chat history log 126 provides an accurate representation of the conversation that occurs between the local IM client 128 and the remote IM client.

The grid scheduling client 130 coordinates a user's calendar appointments in conjunction with the IM client 128. In some embodiments, the grid scheduling client 130 queries the user's calendar client 132 and displays the user's calendar appointments and available time slots on the real-time grid scheduling session 127 in conjunction with a chat session. Alternatively, the grid scheduling client 130 queries the user's calendar client 132 and displays the user's calendar appointments and available time slots on the real-time grid scheduling session 127 separate from a chat session.

FIGS. 3A and 3B depict embodiments of the IM interface 125 and real-time grid scheduling session 127 on the client computer 120 of FIG. 2. Although certain components of the IM interface 126 and the real-time scheduling session 127 are shown and described herein, other embodiments may implement fewer or more components and provide more or less functionality than the components shown in FIGS. 3A and 3B.

In particular, FIG. 3A depicts the IM interface 125 in conjunction with the real-time scheduling session 127. FIG. 3B depicts the real-time scheduling session 127 as an individual application which is independent of a chat session. In some embodiments, the real-time scheduling session 127 is removable from the IM interface 125 such that a user can move the real-time scheduling session 127 to various locations on the display device 124. Alternatively, though the real-time scheduling session 127 of FIG. 3B is not depicted as being integrated in an IM interface 125, in some embodiments, the real-time scheduling session 127 of FIG. 3B is embedded in the IM interface 125, as shown in FIG. 3A.

As explained above, the chat history log 126 and associated real-time scheduling session 127 may be stored in the client memory 129 and displayed on the display device 124 for review by a user. Although the chat history log 126 and real-time scheduling session 127 of FIGS. 3A and 3B are shown with specific content and a particular visual layout, other embodiments may provide more or less content and may use a different visual layout in one or more aspects.

In the depicted embodiment, the IM interface 125 includes a title bar 134, a chat history log 126, and a real-time scheduling session 127. The title bar 134 indicates user information and allows the user to exit the IM interface 125. The chat history log 126 indicates the order in which each instant message occurs. The real-time scheduling session 127 indicates appointments and available time slots of every user involved in the chat and real-time scheduling session 127.

The illustrated chat history log 126 displays text data corresponding to each user, with associated time stamps. In some embodiments, each message may begin on a new line. Additionally, some embodiments may use different types of indicators. For example, some embodiments may use colors, icons, page formatting, or another visual indicator to identify some or all of the text data.

As depicted, the real-time scheduling session 127 includes a date and time bar with a date box 136 to indicate a specific date, time slots 138 to indicate a time series on the specific date, a user list 140 to indicate the users, or participants, associated with the real-time scheduling session 127, and a scroll bar 142 to allow a user to scroll the time slots 138. The date box 136 and time slots 138 indicate the existing appointments and available time slots for each user on the real-time scheduling session 127 according to the specific date and the indicated time series on the specific date. Additionally, the real-time scheduling session 127 of FIG. 3A includes an existing appointment right-click menu 144, a mouse cursor 146, and a priority menu 148 for selecting a priority for an existing appointment. As an illustrated example, participant #2 from the user list 140 right-clicks on an existing appointment at 10:00 A.M. on Jul. 17, 2007. By right-clicking on an existing appointment a user is allowed to assign a priority to the corresponding appointment by choosing a priority from the priority menu 148. For example, a user may have an appointment that is very important and cannot be rescheduled. On the other hand, a user may have an appointment that is not very important and which the user can reschedule at a different time. Thus, the existing appointment right-click menu 144 enables a user to prioritize existing appointments between high priority appointments that cannot be rescheduled and low priority appointments that can be rescheduled. Though the existing appointment right-click menu 144 displays a high-priority option and a low-priority option, some embodiments may display other priority options, including more than two priority levels, and other related calendaring options.

As depicted, the real-time scheduling session 127 of FIG. 3B includes the date box 136, the time slots 138, the user list 140, and the scroll bar 142. Additionally, the real-time scheduling session 127 of FIG. 3B includes an available time slot right-click menu 147, the mouse cursor 146, and a ranking menu 149 for ranking available time slots according to a user's selection. As another illustrated example, participant #2 from the user list 140 right-clicks on an available time slot at 9:00 A.M. on Jul. 17, 2007. By right-clicking on an available time slot, a user is allowed to assign a ranking to an available time slot by choosing a ranking choice from the ranking menu 149. For example, a user may have an available time slot that is preferable over other available time slots for a meeting time, and may have other available time slots that are yet preferable over the other time slots. Thus, the available slot right-click menu 147 enables a user to rank available time slots according to user preference. In some embodiments, the ranking menu 149 includes a first choice, a second choice, and so on, enabling the user to rank as many available time slots as desired.

FIG. 4 depicts a schematic block diagram of one embodiment of the chat server 112 of the IM system 100 of FIG. 1. The illustrated chat server 112 includes a text server 150, a calendar server 152, a grid scheduling server 154, and a server memory 156. The grid scheduling server 154 includes a priority tracker 158. Although certain components of the chat server 112 are shown and described herein, other embodiments may implement fewer or more components and provide more or less functionality than the components shown in FIG. 4.

In one embodiment, the chat server 112 facilitates a text chat session between multiple IM clients. In particular, the text server 150 of the chat server 112 may process text data that is sent between the IM clients. Processing text data of instant messages is known, generally, and is not described in more detail herein. In some embodiments, the text server 150 stores text data on the server memory 156.

In one embodiment, the chat server 112 facilitates a real-time scheduling collaboration between multiple IM clients. In particular, the calendar server 152 may process calendar data that is sent between the IM clients. In some embodiments, the calendar server 152 queries the calendaring systems of each user associated with the chat session and synchronizes the calendaring data from each user's calendar client 132. In some embodiments, the calendar server 152 is an interface for the chat server 112 to query a main calendaring system running on a different server (not shown). In some embodiments, the calendar server 152 includes a dedicated calendar system and stores calendar data related to one or more users. In some embodiments, the calendar server 152 stores calendar data on the server memory 156.

In one embodiment, the grid scheduling server 154 processes grid scheduling requests from users associated with a chat session. In some embodiments, the grid scheduling server 154 processes functions and operations associated with the real-time grid scheduling session 127. In some embodiments, the grid scheduling server 154 processes the functions and operations associated with the real-time grid scheduling session 127 in conjunction with the grid scheduling client 130. For example, a user may perform an operation on the real-time grid scheduling session 127 such as prioritize an existing appointment or rank an available time slot. In some embodiments, the grid scheduling client 130 then communicates the operation to the grid scheduling server 154 which, in turn, communicates the same operation to all of the client computers of the other users associated with the chat session. In other words, when user A on a client computer 102 performs an operation on the real-time grid scheduling session 127 through user A's IM interface 108, the operation may be communicated over the network 106 to the grid scheduling server 154 on the chat server 112. The grid scheduling server 154 then communicates the same operation over the network 106 to user B's client computer 104. Thus, the real-time grid scheduling session 127 displays on the IM interface 110 of user B's client computer 104 the same operation effected by user A on user A's client computer 102. Such operations are communicated and displayed in real-time taking into consideration any practical communication delays that may exist between client computers 102 and 104, the network 106, and the chat server 112.

In one embodiment, the priority tracker 158 tracks the priorities that a user assigns to the user's existing appointments in conjunction with the real-time scheduling session 127. In some embodiments, the priority tracker 158 tracks the rankings a user assigns to the user's available time slots in conjunction with the real-time scheduling session 127. Thus, the priority tracker 158 tracks the priorities and rankings associated with the appointments and available time slots of each of the users associated with a given real-time scheduling session. In some embodiments, the priority tracker 158 stores tracking data related to the priorities and rankings assigned by the different users in the server memory 156. In some embodiments, the grid scheduling server 154 derives potentially available time slots according to the appointment priorities and available time slot rankings. In some embodiments, the grid scheduling server 154 searches for overlapping available time slots in the calendars of each of the users associated with the chat session. In some embodiments, the grid scheduling server 154 stores real-time grid scheduling data on the server memory 156 in conjunction with the priority tracker 158.

If the grid scheduling server 154 is able to find a mutually available time slot overlapping in each of the user's calendars, then the grid scheduling server 154 may automatically propose a meeting time at the mutually available time slot. In some embodiments, the grid scheduling server 154 displays a list of mutually available time slots from which the users can select a meeting time. Alternatively, the grid scheduling server 154 may automatically schedule a meeting time and communicate the scheduled meeting time to the individual clients.

If the grid scheduling server 154 is not able to find a mutually available time slot overlapping in each of the user's calendars, then the grid scheduling server 154 searches for a mix of available time slots and low priority appointments. If the grid scheduling server 154 is not able to find a mutually available time slot nor a mix of available time slots and low priority existing appointments overlapping in each of the user's calendars, then the grid scheduling server 154 notifies the users in real time that no time slot was found according to the real-time priorities and rankings assigned by the users during the real-time grid scheduling session 127.

For example, in a chat session with four users, including participant #1, participant #2, participant #3, and participant #4 from the user list 140 of FIGS. 3A and 3B, the users may collaborate in real time to find an available meeting time on the morning of Jul. 17, 2007. At the 10:00 A.M. time slot of Jul. 17, 2007, participant #2 may right-click on their 10:00 A.M. existing appointment and assign a low priority to their 10:00 A.M. existing appointment. Likewise, participant #4 may right-click on their 10:00 A.M. existing appointment and assign a low priority to their 10:00 A.M. existing appointment. Thus, when the grid scheduling server 154 is not able to find a mutually available time slot overlapping in each of the user's calendars on the morning of Jul. 17, 2007, then the grid scheduling server 154 searches for a mix of available time slots and low priority appointments and finds that the 10:00 A.M. time slot of Jul. 17, 2007, shows two available time slots for participant #1 and #3 and shows two low priority existing appointments for participants #2 and #4. In some embodiments, when the grid scheduling server 154 finds a time slot with a mix of available time slots and low priority appointments, then the then the grid scheduling server 154 automatically proposes or schedules the meeting at the identified time slot. In some embodiments, the grid scheduling server 154 notifies the users that the best potential meeting time is a mix of available and low priority existing appointment time slots and allows the users of the chat session to decide whether to schedule the meeting at that time. In some embodiments, the grid scheduling server 154 displays a list of mutually available time slots and/or a list of mixed available time slots and low priority existing appointment from which the users can select a meeting time.

Figure 5:
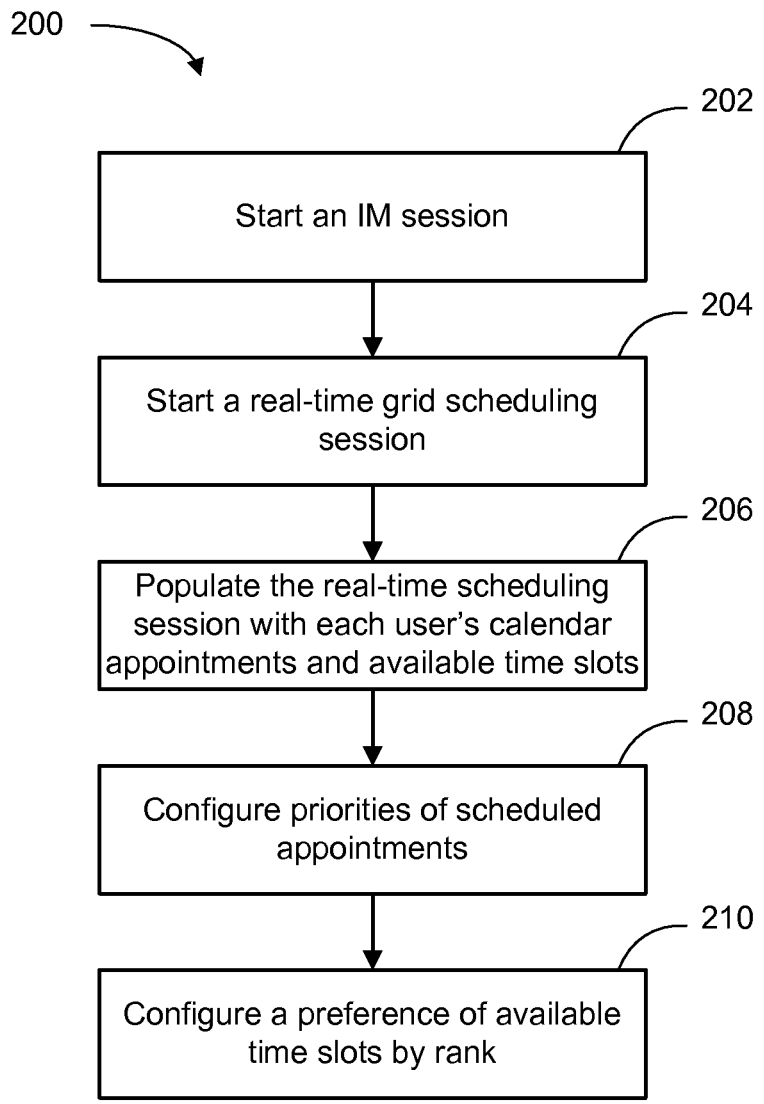
FIG. 5 depicts a schematic flow chart diagram of one embodiment of a client method for the real-time scheduling of a meeting during a chat session.

FIG. 5 depicts a schematic flow chart diagram of one embodiment of a client method 200 for the real-time scheduling of a meeting during a chat session. For ease of explanation, the client method 200 is described with reference to the IM system 100 of FIG. 1 and, in particular, to the client computers 102, 104, and 120 of FIGS. 1 and 2. However some embodiments of the client method 200 may be implemented with other IM systems and/or client computers.

In the illustrated client method 200, the IM clients start 202 an IM session via the instant messaging client 128 in conjunction with the chat server 112. The IM clients then start 204 a real-time grid scheduling session 127 via the grid scheduling server 154 in conjunction with the grid scheduling clients 130 on each of the client computers 102 and 104. In one embodiment, the IM client 128 receives text information from other IM clients via the chat server 112 and stores the text information in the corresponding chat history logs 126 in conjunction with the client memory 129.

The calendar client 132 then populates 206 the real-time scheduling session 127 with each of the user's existing appointments and available time slots for the date and time selected in conjunction with the grid scheduling clients 130 on each of the client computers 102 and 104. In one embodiment, the calendar client 132 populates the existing appointments and available time slots in conjunction with the calendar server 152. In some embodiments, the calendar client 132 continues to populate the existing appointments and available time slots as a user uses the scroll bar 142 to scroll through different displayed times 138, and as a user switches the date in the date box 136.

The grid scheduling client 130 allows a user to configure 208 the priorities of scheduled appointments in conjunction with the grid scheduling server 154. In some embodiments, the grid scheduling client 130 allows the user to configure 208 the user's existing appointments in conjunction with the calendar server 152 and the calendar client 132.

The grid scheduling client 130 also allows a user to configure 210 the ranking preferences of available time slots in the user's schedule in conjunction with the grid scheduling server 154. In some embodiments, the grid scheduling client 130 allows the user to configure 208 the user's preferred available time slots in conjunction with the calendar server 152 and the calendar client 132. The grid scheduling server 154 then uses the user's preferences to propose and/or schedule the meeting time at the most preferred mutually available time slot if one exists.

Figure 6:
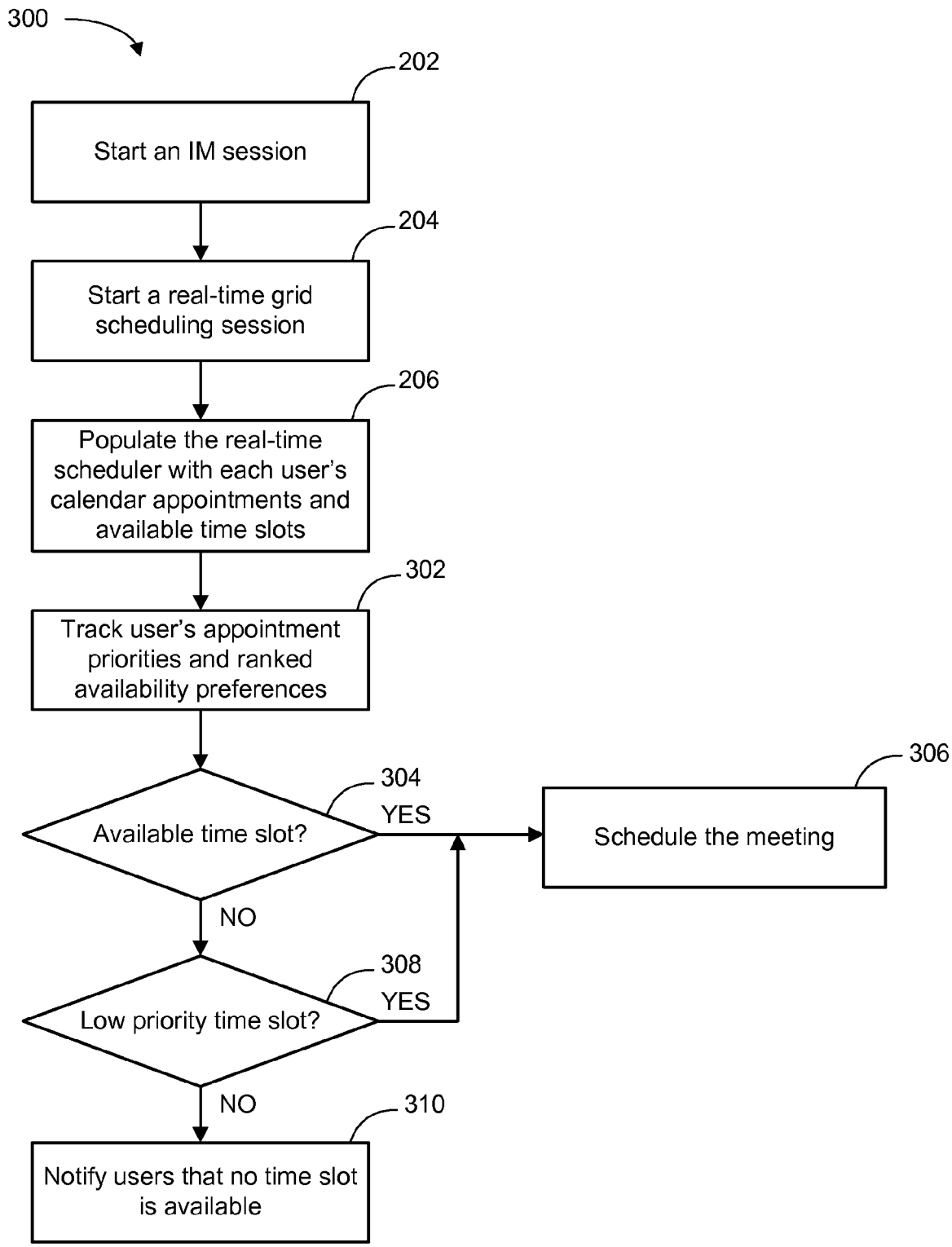
FIG. 6 depicts a schematic flow chart diagram of one embodiment of a server method for the real-time scheduling of a meeting during a chat session.

FIG. 6 depicts a schematic flow chart diagram of one embodiment of a server method 300 for the real-time scheduling of a meeting during a chat session. For ease of explanation, the server method 300 is described with reference to the IM system 100 of FIG. 1 and, in particular, to the chat server 112 of FIGS. 1 and 4. However some embodiments of the server method 300 may be implemented with other IM systems and/or chat servers. Some of the operations of the server method 300 are substantially similar to the client method 200 in that some of the client operations of the client method 200 are executed in conjunction with a corresponding server operation in the server method 300, except as noted below.

In the illustrated server method 300, the priority tracker 158 tracks 302 each of the user's appointment priorities and available time slot ranking preferences for dynamically scheduling a meeting time. In one embodiment, the grid scheduling server 154 processes the priority and preference data from the priority tracker 158 to find a time to schedule the meeting.

The grid scheduling server 154 then determines 304 whether there are any overlapping available time slots in the range according to the priorities and preferences set in real time by each user via their grid scheduling client 130. When the grid scheduling server 154 determines 304 that there is an overlapping available time slot, the grid scheduling server 154 schedules 306 the meeting accordingly. Otherwise, the grid scheduling server 154 then determines 308 whether a mix of low priority existing appointments and available time slots in the user's schedules exist according to the priorities and preferences in real time by each user via their grid scheduling client 130. When the grid scheduling server 154 determines 308 that a mix of low priority existing appointments and available time slots in the user's schedules exists, then the grid scheduling server 154 schedules the meeting accordingly. In some embodiments, the grid scheduling server 154 determines a time slot with only low priority existing appointments as the best time and schedules the meeting. Otherwise, the grid scheduling server 154 notifies 310 the users that no time slot was found for the specific date and time range to schedule a meeting.

It should also be noted that at least some of the operations for the methods 200 and 300 may be implemented using software instructions stored on a computer useable storage medium for execution by a computer. As an example, an embodiment of a computer program product includes a computer useable storage medium to store a computer readable program that, when executed on a computer, causes the computer to perform operations. In one embodiment, the operations include an operation to facilitate a text chat session between a participant on a local instant messaging client and another participant on a remote instant messaging client. The operations include an operation to host a grid scheduling session in real-time in conjunction with the instant messaging clients. The operations include an operation to automatically schedule a meeting time in conjunction with a grid scheduling server according to a real-time input from a participant on the local instant messaging client and another real-time input from another participant on the remote instant messaging client. The grid scheduling session includes a list of times of a specific date arranged transversely to a list of the participants to the meeting.

Further embodiments of the computer program product include an operation to populate the grid scheduling session on each of the instant messaging clients in real-time with available time slots and appointments of each of the participants and with the meeting time automatically scheduled by the grid scheduling server, an operation to assign a priority level to an existing appointment. A low priority level allows the grid scheduling server to schedule over the existing appointment and a high priority level disallows the grid scheduling server to schedule over the existing appointment, and an operation to assign a preference ranking to an existing opening in the schedules of each of the participant. A high preference ranked existing opening is preferred over a low preference ranked existing opening in association with a preferred meeting time of the participant.

Further embodiments of the computer program product include an operation to process the priority levels of the existing appointments of the participants, an operation to process the preference rankings of the available time slots of the participants, and an operation to automatically determine a meeting time according to the priority level and preference ranking assignments of the participants. Another embodiment of the computer program product includes an operation to display the chat history log, and an operation to display the grid scheduling session in real-time. The grid scheduling session includes the existing appointments and the available time slots of each of the participants to the meeting, the priority levels of existing appointments and the preference rankings of available time slots assigned by each of the participants to the meeting, and the scheduled meeting time determined by the grid scheduling client in conjunction with the grid scheduling server.

Another embodiment of the computer program product includes an operation to store the existing appointments and available time slots of the participants, an operation to store the priority levels and preference rankings associated with the existing appointments and available time slots of the participants, and an operation to store the scheduled meeting time determined by the grid scheduling server. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program that, when executed on a computer, causes the computer to perform operations comprising:

facilitate a text chat session between a first participant on a local instant messaging client and a second participant on a remote instant messaging client;

generate a grid scheduling interface for display to the first and second participants, wherein the grid scheduling interface comprises a list of times of a selected date arranged transversely to a list of the participants to a meeting;

host a grid scheduling session in real-time in conjunction with the local and remote instant messaging clients and receive priority levels of existing appointments of the first and second participants, wherein a low priority level allows the meeting to be scheduled over an existing appointment, and a high priority level prevents the meeting from being scheduled over the existing appointment;

receive a first real-time grid scheduling interface input on the grid scheduling interface from the first participant and a second real-time grid scheduling interface input on the grid scheduling interface from the second participant wherein each of the grid scheduling interface inputs comprises an input that assigns preference rankings to available time slots of the first and second participants;

process the preference rankings of the available time slots and the priority levels of the existing appointments, wherein a high preference time slot is preferred over a low preference time slot, and display to both the first and second participants the preference rankings of both the first and second participants;

utilize a combination of the preference rankings and priority levels to automatically propose together at least two meeting times to the first and second participants in conjunction with a grid scheduling server according to the processed preference rankings and priority levels, wherein at least one of the at least two meeting times occurs during one of the existing appointments having a low priority level; and schedule a meeting time from among the proposed meeting times, wherein the scheduling is in conjunction with the grid scheduling server.

2. The computer program product of claim 1, wherein the computer readable program, when executed on the computer, causes the computer to perform operations comprising:

populate the grid scheduling interface on each of the instant messaging clients in real-time with existing appointments and available time slots of each of the participants and with the scheduled meeting time.

3. The computer program product of claim 2, wherein the computer readable program, when executed on the computer, causes the computer to perform operations comprising:

store the existing appointments and available time slots of the participants;

store the priority levels associated with the existing appointments; and store the scheduled meeting time.

4. The computer program product of claim 2, wherein the computer readable program, when executed on the computer, causes the computer to perform operations comprising:

track the priority levels of the existing appointments in real-time;

process the priority levels of the existing appointments; and display the priority levels of the existing appointments in real-time to all participants.

5. The computer program product of claim 1, wherein the computer readable program, when executed on the computer, causes the computer to perform operations comprising:

track the preference rankings of the available time slots in real-time;

process the preference rankings of the available time slots; and display the preference rankings of the available time slots in real-time to all participants.

6. A system comprising:

a chat server to facilitate a text chat session between multiple instant messaging clients; and a grid scheduling server coupled to the chat server, the grid scheduling server configured to:

facilitate a grid scheduling session in real-time in conjunction with the multiple instant messaging clients, to enable each of a first and second participant to assign priority levels to existing appointments, wherein a low priority level allows the grid scheduling server to schedule over a low priority existing appointment, and a high priority level prevents the grid scheduling server from scheduling over a high priority existing appointment;

receive a first real-time grid scheduling interface input on a grid scheduling interface from the first participant and a second real-time grid scheduling interface input on the grid scheduling interface from the second participant, wherein each of the grid scheduling interface inputs comprises an input that assigns preference rankings to available time slots of the first and second participants;

process the preference rankings of the available time slots and the priority levels of existing appointments, wherein a high preference time slot is preferred over a low preference time slot;

utilize a combination of the preference rankings and priority levels to automatically propose together at least two meeting times to the first and second participants according to the processed preference rankings and the priority levels, wherein at least one of the at least two meeting times occurs during one of the existing appointments having a low priority level;

schedule a meeting having a meeting time from among the proposed meeting times; and generate a representation of scheduling information from a scheduling matrix comprising a list of times arranged transversely to a list of the participants to the meeting.

7. The system of claim 6, wherein the grid scheduling server is further configured to track the priority levels of the existing appointments in real-time, to process the priority levels of the existing appointments, and to automatically propose a meeting time according to the priority levels assigned by the participants.

8. The system of claim 6, further comprising a server memory device coupled to the grid scheduling server, the server memory device to store the existing appointments and available time slots of the participants, the priority levels and preference rankings associated with the existing appointments and available time slots of the participants, and the scheduled meeting time from among the proposed meeting times by the grid scheduling server.

9. The system of claim 6, further comprising a calendar server coupled to the grid scheduling server, the calendar server to populate the grid scheduling session on the multiple instant messaging clients in real-time with the available time slots and the existing appointments of each of the participants and with the at least two meeting times proposed by the grid scheduling server.

10. An apparatus comprising:
a local instant messaging client on a hardware storage device to facilitate a chat session with a remote instant messaging client via a chat server; and
a grid scheduling client coupled to the local instant messaging client, the grid scheduling client configured to:
host a grid scheduling session in real-time in conjunction with the local and remote instant messaging clients;
enable a first participant to assign priority levels to existing appointments in a schedule of the first participant in conjunction with a grid scheduling server, wherein a low priority level allows the grid scheduling server to schedule over a low priority existing appointment and a high priority level prevents the grid scheduling server from scheduling over a high priority existing appointment;
receive a first real-time grid scheduling interface input on a grid scheduling interface from the first participant and a second real-time grid scheduling interface input on the grid scheduling interface from the second participant, wherein each of the grid scheduling interface inputs comprises an input that assigns preference rankings to available time slots of the first and second participants;
process the preference rankings of the available time slots and the priority levels of existing appointments, wherein a high preference time slot is preferred over a low preference time slot;
utilize a combination of the preference rankings and priority levels to automatically propose together at least two meeting times to the first and second participants in conjunction with the grid scheduling server according to the processed preference rankings and priority levels, wherein at least one of the at least two meeting times occurs during one of the existing appointments having a low priority level;
schedule a meeting having a meeting time from among the proposed meeting times, wherein the scheduling is in conjunction with the grid scheduling server; and
generate a representation of scheduling information from a scheduling matrix comprising a list of times arranged transversely to a list of the participants to the meeting.

11. The apparatus of claim 10, further comprising a client memory coupled to the grid scheduling client, the client memory to store the proposed at least two meeting times associated with the grid scheduling session between the local instant messaging client and the remote instant messaging client, the existing appointments and available time slots in the schedule of the first participant, and the priority levels of existing appointments and the preference rankings of available time slots assigned by the first participant.

12. The apparatus of claim 10, further comprising a display device coupled to the instant messaging client, the display device to display the grid scheduling interface in real-time to the first participant, wherein the grid scheduling interface comprises the existing appointments and the available time slots of each of the participants to the meeting, the priority levels of the existing appointments and the preference rankings of the available time slots assigned by each of the participants to the meeting, and the proposed at least two meeting times determined by the grid scheduling client in conjunction with the grid scheduling server.

13. A method comprising:
facilitating a text chat session between a first participant on a local instant messaging client and a second participant on a remote instant messaging client;
hosting a grid scheduling session in real-time in conjunction with the local and remote instant messaging clients, and receiving priority levels of existing appointments of the first and second participants, wherein a low priority level allows a meeting to be scheduled over an existing appointment, and a high priority level prevents the meeting from being scheduled over the existing appointment;
generating a grid scheduling interface for display to the first and second participants, wherein the grid scheduling interface comprises a list of times of a specific date arranged transversely to a list of the participants to the meeting;
receive a first real-time grid scheduling interface input on the grid scheduling interface from the first participant and a second real-time grid scheduling interface input on the grid scheduling interface from the second participant wherein each of the grid scheduling interface inputs comprises an input that assigns preference rankings to available time slots of the first and second participants;
process the preference rankings of the available time slots and the priority levels of the existing appointments, wherein a high preference time slot is preferred over a low preference time slot;
utilize a combination of the preference rankings and priority levels to automatically propose together at least two meeting times to the first and second participants in conjunction with a grid scheduling server according to the processed preference rankings and priority levels, wherein at least one of the at least two meeting times occurs during one of the existing appointments having a low priority level; and
scheduling a meeting time from among the proposed meeting times, wherein the scheduling is in conjunction with the grid scheduling server.

14. The method of claim 13, further comprising:
populating the grid scheduling session on each of the instant messaging clients in real-time with existing appointments and available time slots of each of the participants and with the scheduled meeting time;
tracking the priority levels and the preference rankings of the participants in real-time;
processing the priority levels of the existing appointments of the participants; and
automatically determining a meeting time according to the priority levels and preference rankings assigned by the participants.

15. The method of claim 14, further comprising:
displaying the grid scheduling interface in real-time, wherein the grid scheduling interface comprises the existing appointments and the available time slots of each of the participants to the meeting, the priority levels of the existing appointments and the preference rankings of the available time slots assigned by each of the participants to the meeting, and the scheduled meeting time determined by a grid scheduling client in conjunction with the grid scheduling server.

* * * * *